United States Patent
Rhodes

(10) Patent No.: US 8,191,109 B2
(45) Date of Patent: May 29, 2012

(54) APPLICATION VERIFICATION

(75) Inventor: Michael Rhodes, Winchester (GB)

(73) Assignee: Nokia Corporation, Espoo (FI)

( * ) Notice: Subject to any disclaimer, the term of this patent is extended or adjusted under 35 U.S.C. 154(b) by 1009 days.

(21) Appl. No.: 11/491,099

(22) Filed: Jul. 24, 2006

(65) Prior Publication Data

US 2007/0209060 A1    Sep. 6, 2007

(30) Foreign Application Priority Data

Feb. 24, 2006    (GB) ................................... 0603781.6

(51) Int. Cl.
  *G06F 21/00*    (2006.01)
(52) U.S. Cl. .......................................................... 726/3
(58) Field of Classification Search .................. 726/3–5, 726/16–21
  See application file for complete search history.

(56) References Cited

U.S. PATENT DOCUMENTS

| 7,127,524 | B1 * | 10/2006 | Renda et al. ................... 709/245 |
| 7,480,803 | B1 * | 1/2009 | Marballi ....................... 713/178 |
| 2002/2138554 | | 9/2002 | Feigen et al. ................... 709/203 |
| 2002/0194482 | A1 | 12/2002 | Griffin et al. .................. 713/176 |
| 2004/0093595 | A1 * | 5/2004 | Bilange ......................... 717/171 |
| 2004/0153646 | A1 | 8/2004 | Smith .......................... 713/172 |
| 2005/0076246 | A1 * | 4/2005 | Singhal ......................... 713/201 |
| 2005/0154899 | A1 * | 7/2005 | Marvel et al. .................. 713/187 |
| 2007/0028098 | A1 * | 2/2007 | Baartman et al. ............. 713/162 |
| 2009/0084862 | A1 * | 4/2009 | McCallum ...................... 238/12 |
| 2009/0138731 | A1 * | 5/2009 | Jin et al. ....................... 713/194 |
| 2009/0179075 | A1 * | 7/2009 | Shenker et al. ................ 235/382 |
| 2009/0224036 | A1 * | 9/2009 | Adams et al. ................. 235/382 |

FOREIGN PATENT DOCUMENTS

| WO | WO 0072149 | * | 11/2000 |
| WO | WO-0219598 A2 | | 3/2002 |
| WO | WO 2008/070686 | * | 6/2008 |

* cited by examiner

*Primary Examiner* — Nasser Goodarzi
*Assistant Examiner* — Lisa Lewis
(74) *Attorney, Agent, or Firm* — Harrington & Smith

(57) ABSTRACT

A device that is configured for wireless communication and for execution of at least one client application is disclosed. The device comprises an integrated security function configured to process a request for verification of a client application from an external device. A server configured to request for a verification of a client application from an integrated security function of a device is also disclosed. The server is adapted to receive a response from the device, to compare the response to reference data, and to decide, based on the comparison, if the client application is allowed to use a service.

32 Claims, 2 Drawing Sheets

APPLICATION VERIFICATION

FIELD OF THE INVENTION

The present invention relates to verification of applications and in particular but not exclusively to verification of trustworthiness of a client application in a user device.

BACKGROUND OF THE INVENTION

A user device provided with appropriate communication equipment can be used for communication via a communication system. A communication system can be seen as a facility that enables communication sessions between two or more entities such as mobile devices or other nodes associated with the communication system. The communication may comprise, for example, communication of voice, multimedia content, and other data. A session may, for example, be a telephone call type session between two users, a multi-party session, for example a conference call, or a data communication session between at least one user and a node such as an application server (AS). The communication between the communication system and the user device may be over a wireless interface or via a fixed connection.

Various types of services can be provided to users of devices. An example of services is where content, such as images, videos, audio files or other data, may be downloaded from an application server. Examples of content downloading include downloading of screensavers, wallpaper, games, applications, video or music download services. Users may also send data to other entities via a communication system. For example, a user may create something, such as take a photo or make a video, and send his creation in a digitized form, i.e. as content data to a server. The work may then be downloaded from the server by other parties interested of the same subject.

Services that are provided via a communications system are typically implemented using a client/server model. In client/server model a server in a network may control user accounts and billing and manage a catalogue of premium content from which a user can make purchases. A bespoke client application is downloaded or preinstalled on a user device and acts as an agent between the user and the server. When the user purchases content, the client requests the content from the server which passes the premium content to the client for use. For example, in a music player application this would typically be an mp3 file which the client stores to the local file system encrypted and allows the user to play but not copy to other devices.

High-level, object oriented programming languages are commonly used in creating the required software applications. Java programming language is an example of such object oriented languages. There is increasing interest to be able to use Java or another object oriented language to create new and exciting services for mobile users.

A problem with the client/server scenario is that it may be difficult, if not impossible to identify whether an application running on the user device has been tampered with or not. This may be especially a concern with mobile user devices. A tampered (hacked) application can save content unprotected or abuse the service in some other way. For example, it can send false account details, falsify identity numbers (e.g. International Mobile Equipment Identity; IMEI) and so forth.

Furthermore, whilst object oriented languages such as the Java may be ideal for the deployment of client applications, they also make it easy for hackers to reverse-engineer modify and re-install hacked versions of the client. To the server, these hacked clients are indistinguishable from legitimate clients. This may make it very difficult to devise a client/server based service which is secure from attack.

A further drawback is caused by the fact that applications based on Java or similar language are also relatively easy to distribute over the internet. This makes it easy for hackers to distribute their hacked client to others who can then install the hacked client on their own devices and also gain free access to the service provided. In other words, to gain free access does not necessarily require expensive or specialist equipment, it may just require a standard mobile device, for example a standard mobile phone or other relatively simple device, an internet connection and some knowledge of where to get a hacked application from.

Currently, a number of mechanisms have been proposed to overcome this problem. None of the proposals, however, appears capable of preventing client applications being modified and run on user devices.

In accordance with a proposal encryption keys are added into the client application. However, putting the encryption scheme into the client application, and thus available for third parties, increases the risk of sensitive information of the security scheme ending into the hands of the hackers.

A possibility is to try to design the service such that it is less vulnerable to attack. For example, many music download services offer free previews that are designed such that instead of letting the user listen to the whole track, the web based service may offer only a limited time of preview. The services then charges the user before full content is downloaded. This may be effective in most fixed broadband internet applications. However, this may create problems in a wireless environment. For example, the limitation means that the client must download the content twice, i.e. once as a limited preview and once as the full content. This may be expensive, time consuming and may unnecessarily consume wireless communication capacity. Secondly, charging for content before downloading may not be acceptable because the connection to a mobile device may not be reliable in all circumstances. Instead, mobile users may expect to be charged only when the download completes. However, this may be easy to hack so to the server the download always appears to fail.

A possibility is to make every client unique. One way to prevent wide-spread breakout of a service is to put a unique key into every client. The client must send this key to the server during server connection. When the service operator suspects a client is hacked, the operator can add the key of the client to a blacklist in the server thus limiting the damage caused. However, this scheme may not be practical in the mass-market mobile applications. For example, Java applications such as MIDP2.0 must be signed. To include a different key in every copy of the application would require that a unique key is added to the application and each application signed with a certificate by the maker before it is distributed to the user. This may considerably decrease the desirability of the application.

The service provider may also decide not to use a client application that is based on an object oriented language or other similar language for the service. Instead, the service provider will only provide the service on user devices where key parts of the service application are fixedly integrated into an operating system or other platform of the device. If an integrated platform is used, this means that the service application must be part of every device and cannot be installed post production as an after market enhancement.

The term platform is understood to mean something on which something else runs. Thus it can refer to the hardware and/or software environment in which a program runs. For example, the hardware is a platform on which a software runs. The hardware and operating system provides a platform on which an application runs. Java Virtual Machine is an example of a platform on which java applications may run.

Open Mobile Alliance (OMA) has defined a Digital Rights Management (DRM) protocol which attempts to protect content by never sending the 'critical' (e.g. the keys/rights object) information to applications running on mobile devices. Instead, content is sent directly to the platform, for example operating system of the mobile device. In the case of mobile devices, the operating system is provided by the device manufacturer and cannot be easily modified later on. Although this may make the system relatively secure, the OMA DRM cannot be used for many services because it does not offer the ability for a $3^{rd}$ party client application in the terminal to control the download, display or other usage of the content. Furthermore, it does not easily allow a mechanism for $3^{rd}$ party branding or value adding.

SUMMARY OF THE INVENTION

In accordance with an embodiment, there is provided a device that is configured for wireless communication and for execution of at least one client application. The device comprises an integrated security function configured to process a request for verification of a client application from an external device.

In accordance with an embodiment, there is provided a server that is configured to request for a verification of a client application from an integrated security function of a device, to receive a response from the device, to compare the response to reference data, and to decide, based on the comparison, if the client application is allowed to use a service.

In accordance with an embodiment, there is provided a method for verifying trustworthiness of an application. The method comprises processing by an integrated security function of a device a request for verification of a client application in the device; sending a response to the request for verification to an external device; and deciding at the external device, based on the response, if the client application is trustworthy.

In accordance with a more detailed embodiment, the integrated security function is configured to provide the client application with a security token. The client application may send the security token to the external device. The client application may insert the security token in a connection request.

Client applications may be registered with the integrated security function.

The integrated security function may send a signature and/or hash associated with said client application to the external device in response to said request for verification.

A client application may send additional security information to the external device. The additional security information may comprise a key for signing of messages between the client application and the external device. In an embodiment the security function may send further security information to the external device. The further security information may comprise information of at least one of the make of the device, the type of the device model, the model of the device, the version of the device, an identity associated with the device.

The device may be a mobile device.

The embodiments of the invention provide a mechanism for authentication of a client application provided in a device.

BRIEF DESCRIPTION OF THE DRAWINGS

For a better understanding of the present invention and how the same may be carried into effect, reference will now be made by way of example only to the accompanying drawings in which.

DETAILED DESCRIPTION OF EMBODIMENTS OF THE PRESENT INVENTION

Figure 1:
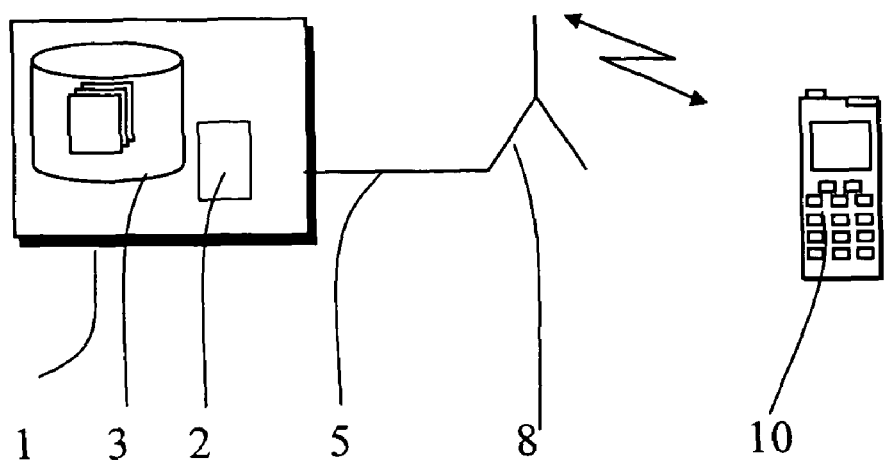
FIG. 1 shows a schematic view of a communications system wherein the present invention may be embodied.

FIG. 1 shows a service provider server 1. The server may be provided with any appropriate data processing apparatus. The server is provided with appropriate data processing and storage facilities 2 and 3, respectively, and an interface for connecting it to a communication system for enabling the server to provide users with services via the communication system. The communication system may provide fixed and/or wireless communications for a user device or terminal.

An explanation of a possible system for enabling communications between a mobile user device 10 and a service provider server 1 is given below. Typically a communication system includes a plurality of various internal entities for controlling and/or carrying communications between two or more communicating parties, for example a user device and an application server. The various control entities may be interconnected. One or more gateway nodes may be provided for connecting a network to other networks, for example for connecting a public switched telephone network (PSTN), a public landline mobile network (PLMN) and/or other communication networks such as an IP (Internet Protocol) and/or other packet switched data networks to each other. In such arrangements, a communications network a user device is connected to can be seen as providing an access network enabling a user to access other networks, hosts, or services offered by specific service providers.

Principles of a wireless communication system will now be explained with reference to a cellular system. Cellular mobile devices will be referred to below as mobile stations. In a cellular system a base station is typically arranged to serve a plurality of mobile stations via wireless interfaces between the mobile stations and base station. In other words, the base station provides radio access for mobile stations. It is appreciated that, although FIG. 1 only shows a base station 8, a typical mobile communication network usually includes a number of base stations. The mobile stations are typically capable of moving from the coverage of a base station to coverage of another base station.

The cellular network can be understood to comprise an access network that is connected to an external data network, for example to a packet switched data network (PSDN), via a gateway node. In a packet data network, a packet data carrier may be established to carry traffic flows consisting of data packets over the network. Each data packet is provided with appropriate routing information, such as destination address and port information so that the various entities in the route to the destination know where the data packet shall be forwarded.

In FIG. 1, the intermediate cellular network located between the server 1 and the base station 8 is not shown for clarity. Instead, a connection 5 is only shown. The connection 5 provides packet switched data transmission in the packet switched domain.

The mobile station 10 may access various services, including services offered by the server 1 via the connection 5 provided by the communication system. The mobile station 10 may thus be used, for example, for tasks such as making and receiving phone calls, for receiving and sending data from and to a server and for experiencing multimedia content. Any appropriate mobile station equipment adapted for communication based on an appropriate protocol, for example the internet protocol (IP), may be used to connect to a server via the access network. For example, a user may connect to the server by means of mobile devices such as a personal computer, a personal data assistant (PDA), a mobile phone, portable computer, combinations thereof or the like.

Figure 2:
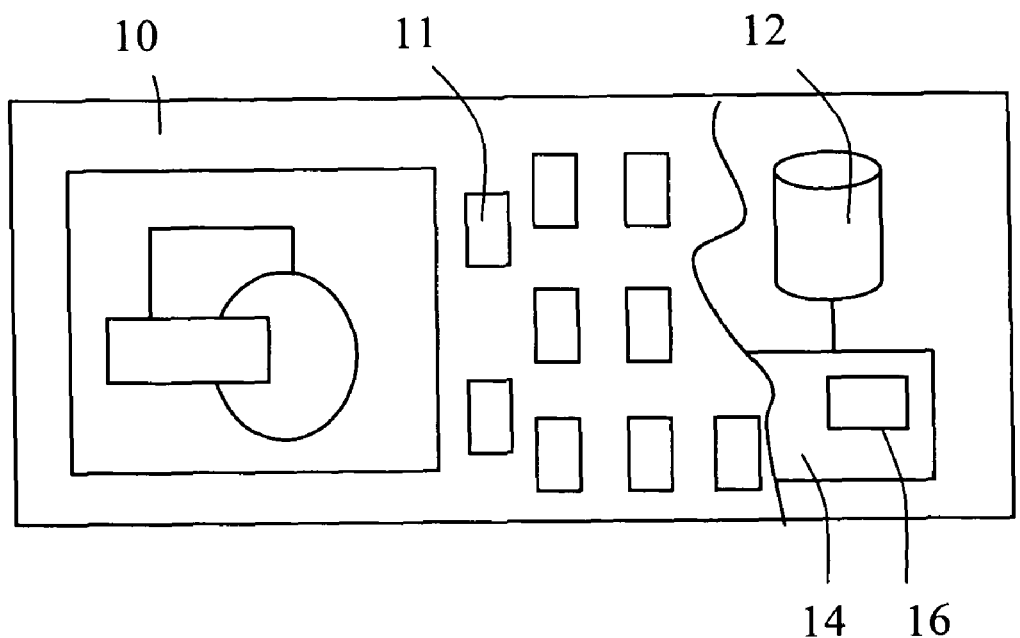
FIG. 2 shows a mobile device.

FIG. 2 shows an example of a mobile station. A mobile station is typically provided with a processor unit and memory 12 for accomplishing various tasks. A mobile station is typically also provided with a display for displaying images and other graphical information for the user thereof. A speaker may also be provided. The operation of the user equipment may be controlled by means of a suitable user interface such as key pad 11, voice commands, touch sensitive screen or pad, combinations thereof or the like.

The following example is given with reference to a device that enables use of client applications 16. In a preferred embodiment the device support for client applications is provided based on Java programming language. In an embodiment, the device is a mobile device, such as a mobile phone, multimedia terminal, PDA, smartphone or the like. It shall be appreciated that the invention is not limited to mobile devices, but embodiments of the invention may be used also in other devices, such as TV set top boxes.

In an embodiment a server can request that the device authenticates a client application running on the device. A mechanism where the device is asked to authenticate a client application can be used to ensure that the client application is legitimate before any sensitive information is passed thereto. Once the client application is authenticated, the client application is trusted not to tamper with the data or store data in an unsecure format. The security function of the device is an integrated part thereof, and may be included into the device for example by the manufacturer of the device. According to a possibility the security function is included in an operating system of the device which the users cannot tamper with.

Figure 3:
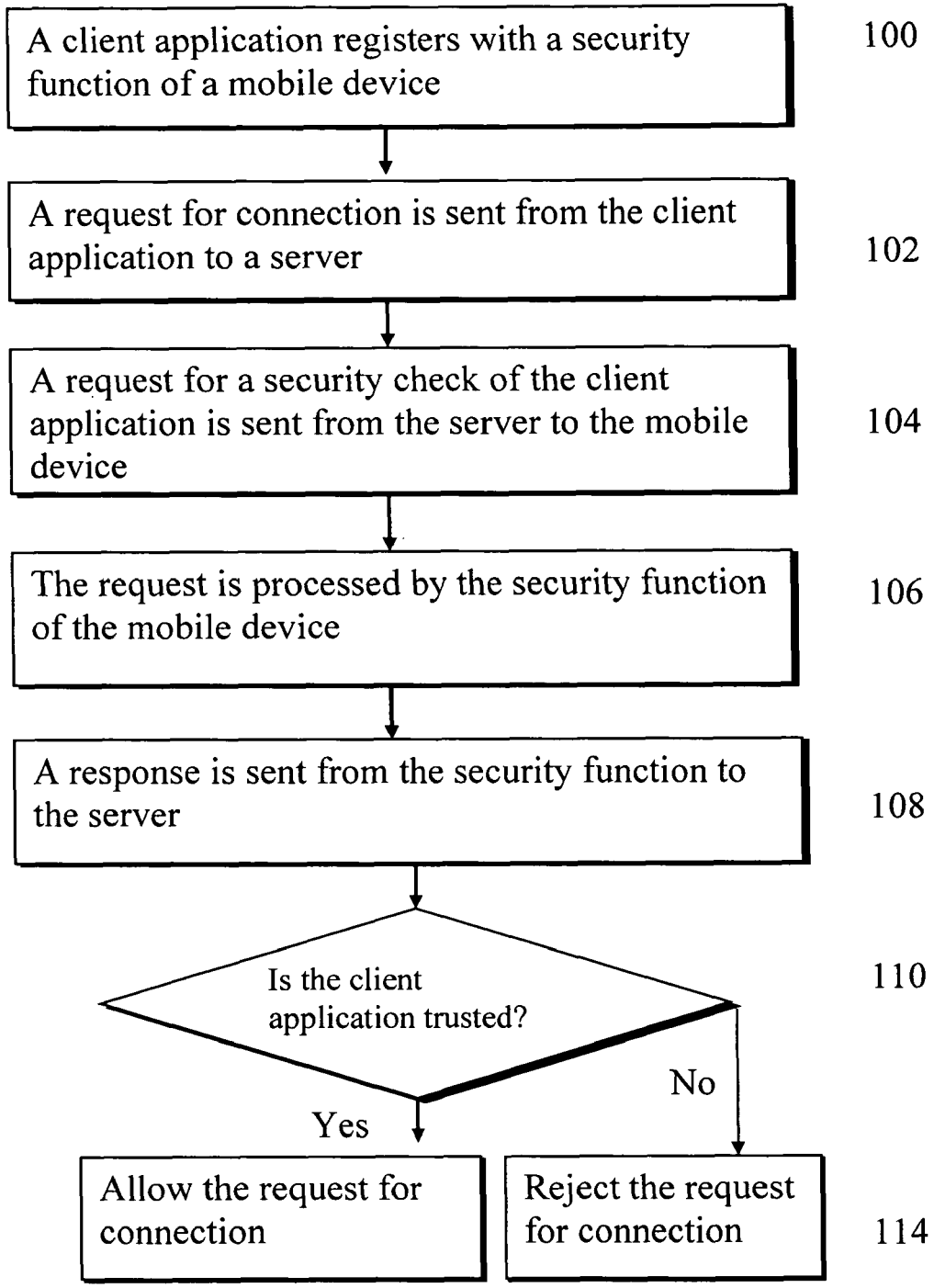
FIG. 3 shows a flowchart in accordance with an embodiment.

Such an authentication mechanism can be implemented in various manners. FIG. 3 shows a flowchart for an example that is described below with reference to Java technology. It is understood that this is only an example, and that similar principles can be applied to other programming technologies, for example compiled languages such as 'C++' and Symbian™ operating systems.

In step 100, a client application registers with a security function of a device, such as a mobile device. For example, the client application may register with a verification service provided within a platform of the device. The client application may use a java Application Programming Interface (API) for the registration.

The verification service may assign the client application at this stage with a token. The token may comprise, for example, a unique number that is randomly generated by the verification service. The token can be used to prove that the server has been given permission by the client application to supply the details thereof. The token can also be used to provide the server with a unique way to identify the client application it wants to have information on.

In step 102, the client application provided in the device sends a connection request to the server. The request may include the token provided by the verification service. The server may then contact at step 104 the verification service of the device that requested for verification of the application. The contact is preferably made via a pre-allocated port number. The server can now use the token to identify the client application to be verified.

The server may contact the user device based on any appropriate mechanism. For example, the server may send the request as a user datagram protocol (UDP) or a transport control protocol (TCP) message to a port number of the device. The port may be reserved specifically for this purpose. Applications and services running on the device can register to listen to a particular socket bound to a port number. All messages sent to that socket and/or port are then routed to the application/service.

At step 106 the verification service of the device creates a hash of the application's executable file. The verification service may use any appropriate hashing algorithm for this. For example, in the case of Mobile Information Device Profile (MIDP), Secure Hashing Algorithm 1 (SHA-1) may be used for the hash. This is advantageous since the Java platform is already capable of using this algorithm to check the signatures of applications. The device/platform may then send the hash back as a response to the server at step 108.

The server checks at step 110 the hash against a list of known/approved hashes, for example a list of hashes generated by all approved applications. If a match is found then a decision to accept the connection and usage of the service can be made, step 112. If no match is found, the request for connections is refused, step 114.

In a further embodiment, the client application may pass in step 104 extra information. For example, the client application may send a random key which can be used to sign future messages between the client application and the server. This may be advantageous in ensuring that the application has not been stopped and replaced with a different application by the user after the verification is done. According to a possibility, a key may be sent to the verification service by the server in step 104 and the verification service may then pass this key to the application as well as giving the hash of the application back to the server at step 108.

Extra information can be sent to the server also at step 108. This extra information can include, for example, name, vendor and signature details for the applications. The extra information may also include information about the device, for example the make, model, software version, identity information, such as International Mobile Equipment Identity (IMEI), International Mobile Subscriber Identity (IMSI), and so on.

In step 110 the token can be returned to the server encrypted using a private key which is unique to the device. A database of public keys may be used to allow the server to authenticate the device and verify the details thereof, such as the make, model and so forth. This may be used to prevent people using for example PDAs or similar devices which do not contain the verification service but only impersonate mobile devices which do.

The embodiments may provide improved security. The embodiments can be used with virtually any client/server based service. The embodiments may allow a server to verify that a client application is authentic and has not been modified.

The embodiments may be applied, in addition to those mentioned above, to a wide variety of other services, such as mobile banking.

The embodiments may be used as an economical alternative for some high cost authentication schemes solutions in some cases. Once a server has authenticated a trusted client, it can send data to the client. Proprietary or open standard mechanisms can be used to then 'lock' the content to the device.

The required data processing functions of the server and user device may be provided by means of one or more data processor entities. Appropriately adapted computer program code products may be used for implementing the embodiments, when loaded to a computing device.

It is understood that although the certain embodiments have been described above with reference to the exemplifying architecture of a cellular mobile communication system, the embodiments may be applied to any other suitable forms of communication systems than the one illustrated and described herein. For example, the mobile device may communicate via a wireless local area network (WLAN), a local base station connected to a fixed line network or a satellite base system.

It is also noted herein that while the above describes exemplifying embodiments of the invention, there are several variations and modifications which may be made to the disclosed solution without departing from the scope of the present invention as defined in the appended claims.

The invention claimed is:

1. A device, comprising:
at least one processor; and
at least one memory including computer program code and at least one client application that is executable by the at least one processor, where the at least one memory and the computer program code are configured, with the at least one processor, to cause the device to at least:
register a client application with an integrated security function of the device;
assign, with the integrated security function of the device, a unique token to the registered client application;
send, by the client application, a connection request to an external device to establish communication with the external device in order to access a service via the external device, wherein the client application includes the assigned unique token in the connection request;
receive, from the external device, a request for verification of the client application, wherein the request for verification is received in response to the connection request by the client application to the external device and wherein the request comprises the unique token to identify the client application to be verified;
processing, by the integrated security function, the request for verification of the client application, comprising sending, with the integrated security function to the external device as a response to the request for verification, at least a hash of the client application for use by the external device for the verification of the client application.

2. The device as claimed in claim 1, wherein the at least one memory including the computer program code is configured, with the at least one processor, to further cause the device to send an encrypted form of the token to the external device, where the token is encrypted with a private key of the device to enable the external device to authenticate the device and verify details of the device.

3. A non-transitory computer readable medium embodying a computer program, the computer program executable by a processor to perform operations comprising:
registering a client application with an integrated security function of a device, wherein the device includes an interface to a wireless communication network, and wherein the client application is executable by the device;
assigning a unique token to the registered client application;
sending, by the client application, a connection request to an external device to establish communication with the external device in order to access a service via the external device, wherein the client application includes the assigned unique token in the connection request;
receiving, from an external device, a request for verification of the client application, wherein the request is received in response to a connection request by the client application to the external device to establish communication with the external device in order to access a service via the external device and wherein the request comprises the unique token to identify the client application to be verified; and
processing, by the integrated security function, the request for verification of the client application, comprising sending, with the integrated security function to the external device as a response to said request for verification, at least a hash of the client application for use by the external device for the verification of the client application.

4. The device as claimed in claim 1, wherein the hash is for use in a comparison against a list of known hashes generated by approved client applications in order to at least authenticate the client application for establishing the communication.

5. The device as claimed in claim 4, wherein the hash is of the client application's executable file and wherein if a match of the hash of the client application is found in said list of known hashes then the communication is established.

6. The device as claimed in claim 1, wherein the client application is registered with the integrated security function to listen to a particular socket bound to a port number, and wherein all messages sent to that socket and port are then routed to the client application.

7. The device as claimed in claim 1, wherein the integrated security function is integrated into one of a fixed platform of the device and an operating system of the device.

8. The device as claimed in claim 1, wherein the device is further caused to reserve a port number for reception of a request for verification, wherein the integrated security function is configured to listen to the reserved port number, and wherein the request for verification is received at the reserved port number and routed to the integrated security function.

9. The device as claimed in claim 1, wherein the device is further caused to send, with the client application, to the external device a random key for use in the communication in order to at least ensure that the client application has not been stopped and replaced after the client application is authenticated by the external device.

10. The device as claimed in claim 1, wherein the security function is configured to use a secure hashing algorithm to verify the signature and create the hash of said client application.

11. The device as claimed in claim 1, wherein the device is further caused, with the integrated security function, to send at least one of a make of the device, a type of the device, a model of the device, a software version of the device, and an identity associated with the device in the response to said request for verification.

12. The device as claimed in claim 1, wherein the device is further caused to execute client applications in at least one of a java language and a complied language.

13. The device as claimed in claim 1, wherein the device is embodied in a mobile device.

14. The device as claimed in claim 13, wherein the mobile device comprises one of a mobile phone, a multimedia terminal, a PDA, and a smartphone.

15. An apparatus, comprising:
at least one processor; and
at least one memory including computer program code, where the at least one memory and the computer program code are configured, with the at least one processor, to cause the apparatus to at least:
receive, by an external device, a connection request from a client application of a device to establish communication with the external device in order to access a service via the external device, wherein the connection request includes a token which uniquely identifies the client application;
request by the external device, in response to the connection request by the client application a verification of the client application from an integrated security function of the device, wherein the request comprises the unique token to identify the client application to be verified;
receive a response to the request for verification from the device, wherein the response comprises at least a hash of the client application;
compare the response to reference data; and
decide, based on comparing the response to the reference data, whether the client application is allowed to use the service.

16. The apparatus as claimed in claim 15, wherein the at least one memory including the computer program code is configured, with the at least one processor, to cause the apparatus to include the security token, received in the connection request from the client application, in the request for verification in order to identify the client application that made the request.

17. The apparatus as claimed in claim 15, wherein the response to the request for verification from the device comprises a hash of the client application, wherein the reference data comprises a list of known hashes generated by approved client applications, and wherein the hash is compared against the list of known hashes in order to at least authenticate the client application for establishing the communication.

18. The apparatus as claimed in claim 15, wherein the response to the request for verification from the device further comprises the security token encrypted using a private key unique to the device in order to allow the apparatus to authenticate the device.

19. The apparatus as claimed in claim 15, wherein the at least one memory including the computer program code is configured, with the at least one processor, to further cause the apparatus to receive, a random key for use in the communication, where the random key is for use in further communication with the client application to at least ensure that the client application has not been stopped and replaced after the client application is authenticated by the apparatus.

20. A method comprising:
receiving, by an external device, a connection request from a client application of a device to establish communication with the external device in order to access a service via the external device, wherein the connection request includes a token which uniquely identifies the client application;
requesting by the external device, in response to the connection request from the client application a verification of the client application from an integrated security function of the device, wherein the request comprises the unique token to identify the client application to be verified;
receiving a response to the request for verification from the device, wherein the response comprises at least of a hash of the client application;
compare the response to reference data; and
deciding, based on comparing the response to the reference data, whether the client application is allowed to use the service.

21. The method as claimed in claim 20 further comprising receiving at the external device an encrypted form of the token from the device in the response to the request for verification, wherein the token is encrypted with a private key of the device to enable the external device to authenticate the device and verify details of the device.

22. The method as claimed in claim 20, wherein the reference data comprises a list of known hashes generated by approved client applications, and wherein the hash is compared against the list of known hashes in order to at least authenticate the client application for establishing the communication.

23. The method as claimed in claim 20 performed by a computer program embodied on a memory and executed by at least one processor.

24. A method, comprising:
registering, with an integrated security function of a device, a client application of the device, wherein the device includes an interface to a wireless communication network, and wherein the client application is executable by the device;
assigning a unique token to the registered client application;
sending, by the client application of the device, a connection request to an external device to establish communication with the external device in order to access a service via the external device, wherein the client application includes the unique token in the connection request;
receiving, from the external device, a request for verification of the client application, wherein the request is received in response to the connection request by the client application to the external device and wherein the request comprises the unique token to identify the client application to be verified; and
processing, by the integrated security function, the request for verification of the client application, comprising sending, with the integrated security function to the external device as a response to the request for verification, at least a hash of the client application for use by the external device for the verification of the client application.

25. The method as claimed in claim 24, wherein the client application is registered with the integrated security function to listen to a particular socket bound to a port number, and wherein all messages sent to that socket and port are then routed to the client application.

26. The method as claimed in claim 24, further comprising sending an encrypted form of the token to the external device in the response to the request for verification, wherein the token is encrypted with a private key of the device to enable the external device to authenticate the device and verify details of the device.

27. The method as claimed in claim 24, wherein the hash is for use by the external device in a comparison against a list of known hashes generated by approved client applications in order to at least authenticate the client application for establishing the communication.

28. The method as claimed in claim 24, wherein the integrated security function is integrated into one of a fixed platform of the device and an operating system of the device.

29. The method as claimed in claim 24, further comprising: sending, to the external device, a random key for use in the communication in order to at least ensure that the client application has not been stopped and replaced after the client application is authenticated by the external device.

30. The method as claimed in claim 29, further comprising: signing messages between the client application and the external device based on the random key.

31. The non-transitory computer readable medium embodying the computer program as claimed in claim 3, the computer program executable by the processor to perform further operations comprising sending an encrypted form of the token to the external device in the response to the request for verification, wherein the token is encrypted with a private key of the device to enable the external device to authenticate the device and verify details of the device.

32. The computer readable medium as claimed in claim 3, wherein the request for verification from the external device comprises the security token, included in the connection request, in order to identify the client application that made the request.

* * * * *

UNITED STATES PATENT AND TRADEMARK OFFICE
CERTIFICATE OF CORRECTION

| | | |
|---|---|---|
| PATENT NO. | : 8,191,109 B2 | Page 1 of 1 |
| APPLICATION NO. | : 11/491099 | |
| DATED | : May 29, 2012 | |
| INVENTOR(S) | : Rhodes | |

It is certified that error appears in the above-identified patent and that said Letters Patent is hereby corrected as shown below:

Claim 20, col. 10, line 2 delete "of" in-between least and a.

Signed and Sealed this
Thirty-first Day of July, 2012

David J. Kappos
*Director of the United States Patent and Trademark Office*